G. MUSSO.
TRANSMISSION OF ELECTRICAL IMPULSES OVER CIRCUITS OF HIGH ELECTROSTATIC CAPACITY.
APPLICATION FILED MAR. 14, 1914.

1,216,595.  Patented Feb. 20, 1917.

Witnesses:
A. H. Abell
A. Rojinsky

Giuseppe Musso Inventor
By his Attorney Lewis J. Doolittle

UNITED STATES PATENT OFFICE.

GIUSEPPE MUSSO, OF VADO, ITALY.

TRANSMISSION OF ELECTRICAL IMPULSES OVER CIRCUITS OF HIGH ELECTROSTATIC CAPACITY.

1,216,595.      Specification of Letters Patent.      Patented Feb. 20, 1917.

Application filed March 14, 1914. Serial No. 824,680.

*To all whom it may concern:*

Be it known that I, GIUSEPPE MUSSO, a subject of the King of Italy, and resident of Vado, Province of Genoa, Italy, have invented certain new and useful Improvements in Transmission of Electrical Impulses Over Circuits of High Electrostatic Capacity, of which the following is a specification.

This invention relates to the transmission of electrical impulses over circuits of high electrostatic capacity and, more particularly, to a method of improving, both in quality and efficiency, the transmission of telephonic messages over long distance circuits, constituted of either cables or open wires.

Up to the present time the efforts of inventors, as far as I am aware, have been directed to the improvement of the conditions in the line wire by reducing, so far as possible within the limits permitted by practicability, the ohmic resistance of the line and neutralizing the electrostatic capacity of the same by means of inductance loads applied to the line. A phantom circuit to the exclusion of two physical circuits for the same distance has also been used but none of these methods, so far as I am aware, have produced satisfactory results.

By my system I am able to reduce the effect of the impedance of the line to such an extent as to allow commercial communication by telephone to practically any distance, over either an aerial line wire or cable. I neutralize the effect of the electrostatic capacity of the line by building up phono-electric waves or currents in a home circuit containing inductance arranged so as to make such wave or current proof, so to speak, against the distorting effect of the opposite characteristic or electrostatic capacity of the line. Moreover, I obviate the so called retardation by maintaining an electric charge on the line so that my waves or currents are superimposed on said charge, or, it may be, they cause corresponding vibrations to take place in said electric charge by jolting it, so to speak, and making such vibrations operative at the distant end of the line.

In my system the primary impulse or wave or current from the battery is of little or no value as a direct operating impulse on long lines and cables. Instead, my working waves or currents are of a secondary and tertiary nature caused by the collapse of the field of the inductance coil, which tertiary wave is a most important factor in the efficiency of my system.

In carrying out my invention, I impress upon the main line an impulse of predetermined characteristics, suitable to overcome the impedance of the line, this impulse being the result of the fluctuation or discharge of the electromagnetic field produced by a suitably constructed solenoid inserted in a local circuit, such circuit containing a battery or other suitable source of electromotive force. By this arrangement, knowing the characteristics of the main line, and, consequently, the retardation that an impulse would be subjected to, if sent directly from a battery, and the lag of the voltage behind the current, the self-inductance of the local circuit can be adjusted to establish, in said circuit, conditions directly opposite to those existing in the main line, *i. e.*, to cause the current to lag behind the voltage to an equal degree as the voltage would otherwise lag or be retarded by the capacity of the main line. Thus, the impulse will start bearing the prevailing characteristics of the local circuit, but it will be gradually affected by the opposite characteristics of the main line circuit, until, upon reaching the receiving end of the main line, the components of each impulse, *i. e.*, the voltage and amperage will appear to be in phase, or nearly so, while no trace of the usual retardation in operating the line will be experienced. By this process I do, virtually, reduce by neutralization the impedance of the line to its ohmic resistance only.

The novel features of my invention will appear more fully in connection with the description which follows of the embodiment of the same illustrated in the accompanying drawings, in which like parts in the different views have been given the same reference numerals.

Figure 1:
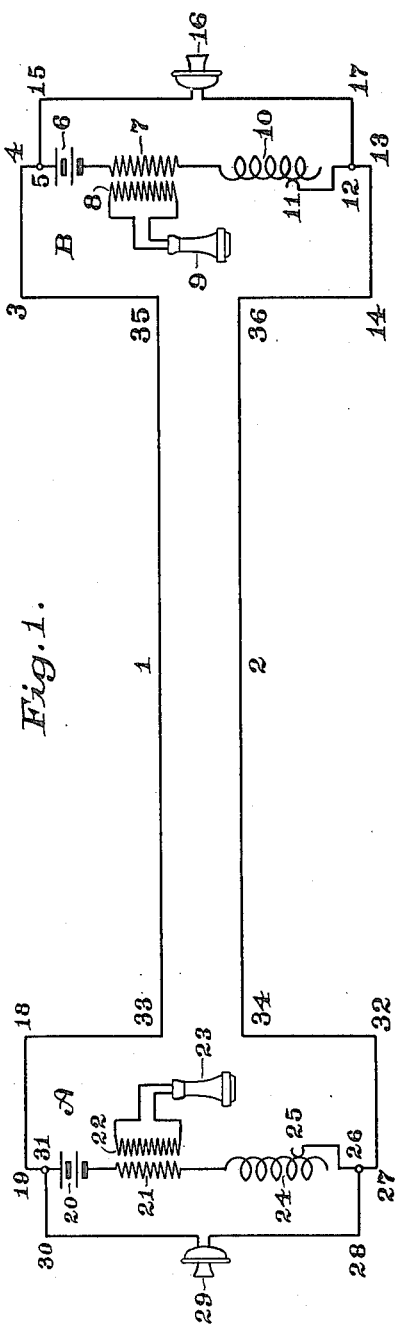
Figure 1 is a diagrammatic illustration of one arrangement or embodiment of the invention.

Referring to Fig. 1, the arrangement at A and B represent diagrammatically two telephone stations equipped with my system, said stations being connected through the lines 1 and 2. It will be understood that the metallic circuit represented in the diagram either line 1 or 2 could be substituted by ground connections. At station A 29 is a telephone transmitter; 20 a battery or suitable source of electro-motive force; 21 is the primary of an induction coil and 22 is the secondary of the same; 23 a telephone receiver; 24 a solenoid or inductance coil and 25 a sliding contact rendering the inductance coil 24 adjustable.

The transmitter 29 is connected at 31 and 26 to the main line 1—2. The battery 20, the primary 21 of the induction coil and the inductance coil 24 are connected in series and connected to the main line 1—2 at 31 and 26.

It will be understood that the telephone transmitter 29 could be substituted by any other device capable of varying the resistance of the circuit 26, 28, 30, 31, or opening and closing the same, or causing in any way fluctuations in the charge or in the magnetic field of the solenoid or inductance coil 24, which is made preferably of relatively large wire and without an iron core.

Station B being similar to station A, no description of its details is deemed necessary. The transmitter 16, battery 6, primary 7 and secondary 8 of the induction coil, receiver 9, inductance coil 10 and its sliding contact 11, are connected together and to the line 1—2 at 5 and 12 as described for station A.

In the arrangement shown in Fig. 1, the above mentioned electric charge on the main line is maintained by that portion of current not shunted by the transmitters 29 and 16 from the batteries 20 and 6 at the stations A and B. If batteries 20 and 6 have their like poles connected at 31 and 5 respectively, the line 1—2 will constitute a neutral circuit so far as a continuous current is concerned, that is, the charge will be of a static nature, the charge on the line 1 being of a polarity opposite to that of the charge on line 2. Of course, in practice a perfect balance could not be maintained, nor is such a balance necessary.

By my arrangement I have therefore satisfied or neutralized, to an extent at least, the requirements of the electrostatic capacity of the line, so that the impulses, currents or waves to be transmitted will not themselves be absorbed, either partially or entirely, by reason of satisfying first the exigency of the electrostatic capacity of the line, which would otherwise cause the impulses to suffer retardation and distortion. The impulses will therefore go through the line practically as if the latter contained only ohmic resistance, or, as explained before, they will shake or jolt, so to speak, the electric charge of the line, causing corresponding vibrations in the charge throughout the line.

This, however, is not the point that marks the limit of my invention. In fact, in an ordinary circuit opposing a certain ohmic resistance, the volume of the impulses can be increased by increasing the current generating them. This, however, is not and cannot be a case of simple application of the features of my invention, as the source of electromotive force (the battery, for example) here is to be considered only as a primary means for generating electrical impulses or waves. My working impulses or waves are of an electromagnetic nature and are set up by a solenoid or inductance coil. This solenoid or inductance coil forming part of an electromagnetic circuit, must be designed so as to possess a limit of saturation suitable for the formation of impulses of the desired volume for a given ohmic resistance of the main line circuit. Now, when the limit of saturation of a solenoid is reached, a larger supply of current would not be profitable, in fact might be detrimental.

My invention, therefore, is not limited to the means of neutralizing the effect of electrostatic capacity in a given line, but includes also that of overcoming the ohmic resistance of said line by causing the same solenoid to set up impulses of proper intensity in relation, specifically, to the ohmic resistance of that line.

The operation of the system is as follows:—

As long as the transmitter 29 (Fig. 1, station A) is not operated the current from battery 20 will pass through the circuit 31, 30, 29, 28, 26, 25, 24 and 21, thereby causing a magnetic field of the desired intensity to be built up about the solenoid or inductance coil 24. This field now represents a potential energy which will be translated into kinetic energy at the proper instant, as will be explained later on.

Now let us assume that the diaphragm of transmitter 29 is operated so that during one half of a vibration of the same the resistance of the transmitter is increased; then it will appear that the magnetic field surrounding the inductance coil 24 will partially collapse, instantly passing on the line in the form of a current or wave, by the way of 21, 20, 31, 19, 18, 33, 1, 35, 3, 4, 5, 6, 7, 10, 11, 12; (and also through 5, 15, 16, 17 and 12,) 13, 14, 36, 2, 34, 32, 27, 26 and 25. Thus the receiver 9 (Fig. 1, station B) will be actuated through the secondary coil 8. Meanwhile the diaphragm or transmitter 29 completes the other half vibration in returning to its position of rest, thereby decreasing the resistance of the transmitter and causing the battery 20 to yield more current, which again will prepare or build up the magnetic field around 24.

It is obvious that during the operation just explained there is also a primary current going out on the line, but this will only have a negligible effect in the neighborhood of the station in the case of a line characterized by a high impedance. In any event, these primary waves will cause the static charge of that portion of the line near the transmitting station to fluctuate without impairing the transmission of the electro-magnetic waves and they will contribute to the action already explained of causing operative vibrations to take place throughout the charge on the line.

Figure 2:
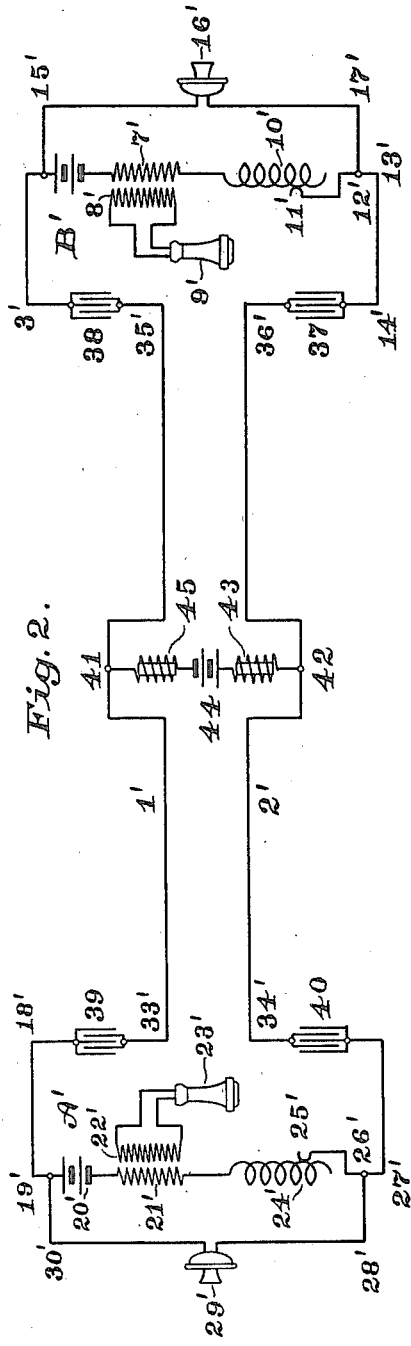
Fig. 2 is a diagrammatic illustration of a modification of the arrangement shown in Fig. 1.

Referring to Fig. 2, it will be seen that the arrangement is similar to that of Fig. 1, except for the addition of condensers 37 and 38 at station B' and 39 and 40 at station A' inserted in the main line circuit and the addition of battery 44 and impedance or checking coils 43 and 45 bridging the line at 41 and 42. The function of the battery 44 is that of maintaining on the main line 1—2 an electric charge, while the impedance coils 43 and 45 prevent the line from being short-circuited with respect to the transmitted working impulses, currents or waves. The remaining elements and circuits are the same as in Fig. 1 and have been correspondingly numbered, with the addition of a "prime", i. e., 29'—16', etc., and the operation just described for Fig. 1 can be read on Fig. 2 with this in mind.

It will also be seen that, by reason of the position and arrangement of the telephone receiver as shown in the diagrams, two important advantages are attained; firstly, the telephone receiver will not respond clearly or loudly to the local action during transmission, owing to the choking effect of the inductance coil and, secondly, the incoming waves or impulses will be intensified by said inductance coil acting as a reactor, and the more so, as said reactor is normally kept charged by either the local battery or the line. In other words, the impulses generated in the local circuit at the transmitting end of the line have different characteristics from that which they have after traveling over the line, being affected by the characteristics due to the capacity of said line, to the opposite or receiving end. The characteristics of said impulses in the local circuit at the transmitting end of the line do not produce an effective result in the receiver at this end of the line.

As many changes could be made in the above constructions and arrangements and many apparently widely different embodiments of my invention designed without departing from the scope of the appended claims, I intend that all matter contained in the above description or shown in the accompanying drawings shall be interpreted as illustrative merely of operative embodiments of my invention and not in a limiting sense.

What I claim is:—

1. A telephone circuit consisting of a main line connecting two home circuits, means for maintaining an electric charge on said main line adapted to satisfy the electrostatic capacity of said line sufficiently to reduce the distortion and retardation affecting the transmission of electrical impulses, the said home circuits also including a source of electro-motive force, the primary of an induction coil, the secondary of which contains a telephone receiver, a source of inductance and a telephone transmitter connected in series, the said transmitter being connected in shunt with said line, said source of inductance having a predetermined self-inductance and output adapted to produce tertiary impulses having characteristics opposite to those which would normally be impressed upon said impulses by the characteristics of said main line, the said home circuits being arranged and adapted for generating the aforesaid tertiary impulses and transmitting the same along said main line superimposed on said electric charge and detecting or receiving them at the distant end of the line.

2. A telephone circuit consisting of a main line connecting two home circuits, means for maintaining an electric charge on said main line adapted to satisfy the electrostatic capacity of said line sufficiently to reduce the distortion and retardation affecting the transmission of electrical impulses, the said home circuits also including a source of electro-motive force, the primary of an induction coil, the secondary of which contains a telephone receiver, a source of inductance and a telephone transmitter connected in series, the line being connected thereto through condensers and said transmitter being connected in shunt therewith, said source of inductance having a predetermined self-inductance and output adapted to produce tertiary impulses having characteristics opposite to those which would normally be impressed upon said impulses by the characteristics of said main line, the said home circuits being arranged and adapted for generating tertiary impulses as herein set forth and transmitting the same along said main line superimposed on said electric charge and detecting or receiving them at the distant end of the line.

3. The herein described system for the transmission of electrical impulses, consisting of a home circuit containing a telephone transmitter, a source of electro-motive force, the primary of an induction coil, the secondary of which includes a telephone receiver, a solenoid of predetermined self-inductance which is so proportioned as to balance or neutralize the electrostatic capacity of the main line and of predetermined output and intensity sufficient for overcoming the ohmic resistance of the main line upon which said impulses are impressed, said main line being connected with said home circuit in shunt with said telephone transmitter.

4. The herein described system for the transmission of electrical impulses, consisting of a home circuit containing a telephone transmitter, a source of electro-motive force, the primary of an induction coil, the secondary of which includes a telephone receiver, a solenoid of predetermined self-inductance which is so proportioned as to balance or neutralize the electrostatic capacity of the main line and of predetermined output and intensity sufficient for overcoming the ohmic resistance of the main line upon which said impulses are impressed, said main line being connected through condensers with said home circuit in shunt with said telephone transmitter, means for maintaining an electric charge on the main line from an independent source of electro-motive force, the current from which is passed through impedance coils to prevent short-circuiting the line with respect to the said working impulse.

5. A telephone circuit consisting of a main line connecting two home circuits, means for maintaining an electric charge on said main line adapted to act as a transmitting medium and to satisfy the electrostatic capacity of said main line sufficiently to reduce the distortion and retardation otherwise affecting the transmission of electrical impulses, the said home circuits each containing a telephone transmitter, a source of electro-motive force, the primary of an induction coil, the secondary of which includes a telephone receiver and a source of inductance connected in series, the said source of inductance consisting of an inductance coil of predetermined self-inductance and output adapted to produce electro-magnetic impulses having characteristics opposite to those which would normally be impressed upon them by the characteristics of said main line, the said line being connected in shunt with the said telephone transmitter, the said home circuits being arranged and adapted for generating the said electromagnetic impulses and transmitting the same along said main line by superimposition on said electric charge, thereby causing the transmission to take place by the propagation of a disturbance in said charge as an elastic medium, and receiving or detecting them at the distant end of the line.

6. A telephone circuit consisting of a main line connecting two home circuits, means for maintaining an electric charge on said main line adapted to act as a transmitting medium and to satisfy the electrostatic capacity of said main line sufficiently to reduce the distortion or retardation otherwise affecting the transmission of electrical impulses, the said home circuits each containing a source of electro-motive force, a telephone transmitter, a source of inductance and the primary of an induction coil in series with said inductance, the secondary of the induction coil including a telephone receiver, the said primary of the induction coil being inserted in circuit with said inductance thereby rendering the telephone receiver non-responsive to local action but responsive to incoming impulses which would be thereby intensified owing to the reaction of the inductive elements of the circuit, said inductive elements being kept electrically excited, said line being connected so as to shunt the telephone transmitter.

Signed in the city, county and State of New York, this 11th day of March, 1914.

GIUSEPPE MUSSO.

Witnesses:
LEWIS J. DOOLITTLE,
ANNA ROZINSKY.